US012736736B2

(12) United States Patent
Shiau et al.

(10) Patent No.: US 12,736,736 B2
(45) Date of Patent: Sep. 15, 2026

(54) SURFACE LIGHT SOURCE MODULE AND DISPLAY DEVICE

(71) Applicant: Coretronic Corporation, Hsin-Chu (TW)

(72) Inventors: Tzeng-Ke Shiau, Hsin-Chu (TW); Ying-Shun Syu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 19/353,618

(22) Filed: Oct. 9, 2025

(65) Prior Publication Data

US 2026/0104542 A1 Apr. 16, 2026

(30) Foreign Application Priority Data

Oct. 15, 2024 (CN) ......................... 202422487613.4

(51) Int. Cl.
*F21V 8/00* (2006.01)

(52) U.S. Cl.
CPC ......... *G02B 6/0036* (2013.01); *G02B 6/0076* (2013.01)

(58) Field of Classification Search
CPC .. G02B 6/0036; G02B 6/0076; G02B 6/0035; G02B 6/0033; G02B 6/0011; G02F 1/133615; F21V 2200/20
See application file for complete search history.

(56) References Cited

U.S. PATENT DOCUMENTS

| | | | | |
|---|---|---|---|---|
| 8,496,368 B2 * | 7/2013 | Tiao | ..................... | G02B 6/0043 362/617 |
| 2017/0192152 A1 * | 7/2017 | Choi | ..................... | G02B 6/0055 |
| 2025/0244519 A1 * | 7/2025 | Shiau | ..................... | G02B 6/0063 |

FOREIGN PATENT DOCUMENTS

| | | |
|---|---|---|
| TW | M657469 U | 7/2024 |

* cited by examiner

*Primary Examiner* — Bao Q Truong

(57) ABSTRACT

A surface light source module includes a light guide plate. The light guide plate has a first surface on which a plurality of microstructures are provided. Each microstructure has a first structural surface and a symmetry plane, a boundary between the first structural surface and the symmetry plane is provided with a first intersection line, the first intersection line includes a first line segment part, and the first line segment part has a first end and a second end that are opposite to each other. There is a first height between the first end and the first surface, there is a second height between the second end and the first surface, each microstructure has a maximum depth, and an absolute value of a difference between the first height and the second height is greater than or equal to one-third of the maximum depth. A display device is also provided.

15 Claims, 7 Drawing Sheets

A1(111)
101
110
101
PG
D1
a
O
b
M2
M1
100
Z
X
Y
D2

SURFACE LIGHT SOURCE MODULE AND DISPLAY DEVICE

CROSS-REFERENCE TO RELATED APPLICATION

This application claims the priority benefit of China application No. 202422487613.4, filed on Oct. 15, 2024. The entirety of the above-mentioned patent application is hereby incorporated by reference herein and made a part of this specification.

TECHNICAL FIELD

The disclosure relates to a light source module, and in particular to a surface light source module and a display device.

BACKGROUND

A reflective display device can reflect ambient light to allow a user to see a display image. However, in the case of insufficient ambient light, a light source is usually provided by a front light module. An existing front light module usually uses a light guide plate to make light emitted uniformly. For example, a plurality of microstructures are disposed on an upper surface of the light guide plate to make the light emitted more uniformly. However, there is still a problem of non-uniformly emitted light in the existing front light module.

The information disclosed in this "BACKGROUND" section is only for enhancement understanding of the background and therefore it may contain information that does not form the prior art that is already known to a person of ordinary skill in the art. Furthermore, the information disclosed in this "BACKGROUND" section does not mean that one or more problems to be solved by one or more embodiments of the disclosure were acknowledged by a person of ordinary skill in the art.

SUMMARY

An embodiment of the disclosure provides a surface light source module, including a light guide plate and a light source element. The light guide plate has a first surface and a second surface that are opposite to each other, and a light incident surface connecting the first surface and the second surface, and the first surface is provided with a plurality of microstructures. The light source element is disposed opposite to the light incident surface. Each microstructure has a first structural surface connecting the first surface, each microstructure has a symmetry plane, the symmetry plane is perpendicular to the first surface, a boundary between the first structural surface and the symmetry plane is provided with a first intersection line, the first intersection line includes a first line segment part, and the first line segment part has a first end and a second end that are opposite to each other. There is a first height between the first end and the first surface, there is a second height between the second end and the first surface, each microstructure has a maximum depth, and an absolute value of a difference between the first height and the second height is greater than or equal to one-third of the maximum depth. A distance between each position point of the first line segment part and a corresponding position point of a part of a contour of a geometric shape in a first direction is less than or equal to one-fifth of a half-axis length of a first axis of the geometric shape. The first direction is perpendicular to the first surface, and the geometric shape conforms to:

$$\frac{x^2}{b^2} + \frac{y^2}{a^2} = 1,$$

where $-a \le y \le a$, $-b \le x \le b$, a ratio of a to b is between 0.1 and 2, a is the half-axis length of the first axis, and b is a half-axis length of a second axis of the geometric shape.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the disclosure may be practiced. In this regard, directional terminology, such as "top", "bottom", "front", "back", etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. The use of "at least one of . . . and . . . " thereof herein may include "one or more of one or more of the items contained in the list". For example, the use of "at least one of A and B" thereof herein may include only A, or only B, or A and B. Similarly, the use of "at least one of A, B, and C" thereof herein may include only A, or only B, or only C, or any combination of A, B, and C. Accordingly, the drawings and descriptions will be regarded as illustrative in nature and not as restrictive.

Figures 1, 2:
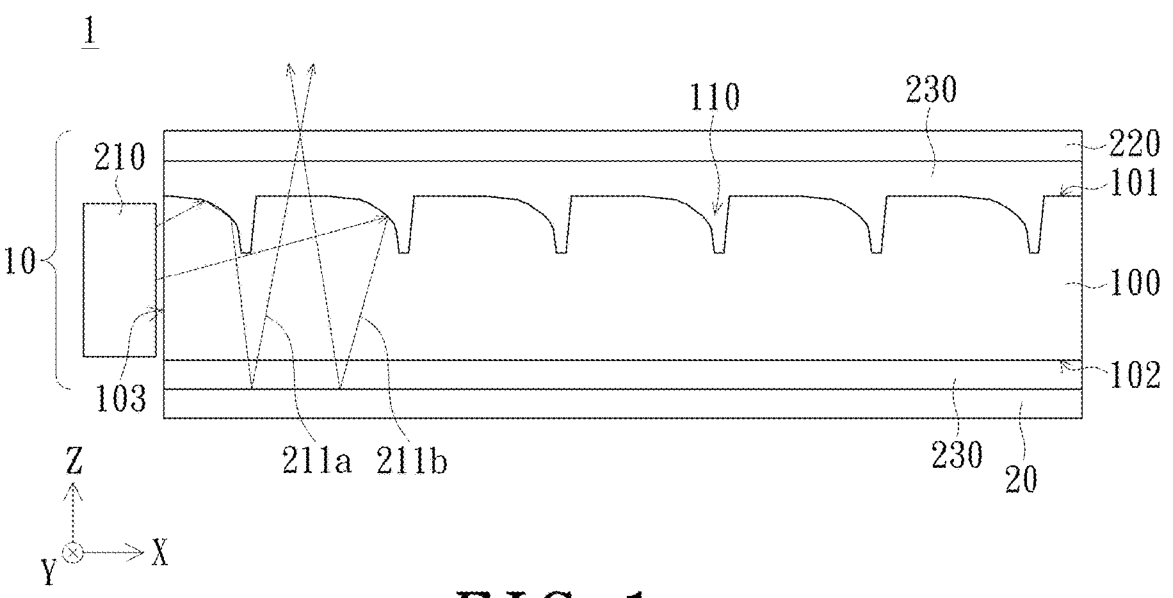
FIG. 1 is a schematic sectional view of a display device according to an embodiment of the disclosure.
FIG. 2 is a schematic enlarged view of a microstructure in FIG. 1.

FIG. 1 is a schematic sectional view of a display device according to an embodiment of the disclosure. Refer to FIG. 1. A display device 1 in one embodiment of the disclosure includes at least one surface light source module 10 and a display element 20. For example, there is one surface light source module 10 in this embodiment, which is not limited thereto. Each of the at least one surface light source module 10 includes a light guide plate 100 and a light source element 210. The light guide plate 100 has a first surface 101 and a second surface 102 that are opposite to each other, and a light incident surface 103 connecting the first surface 101 and the second surface 102. The first surface 101 is provided with a plurality of microstructures 110. The light source element 210 is disposed opposite to the light incident surface 103. The light source element 210 in this embodiment includes, for example, a plurality of light-emitting units, and the light-emitting units are, for example, light-emitting diodes, which is not specifically limited in the disclosure. The display element 20 in the display device 1 in this embodiment is, for example, a reflective liquid crystal panel.

Figure 3:
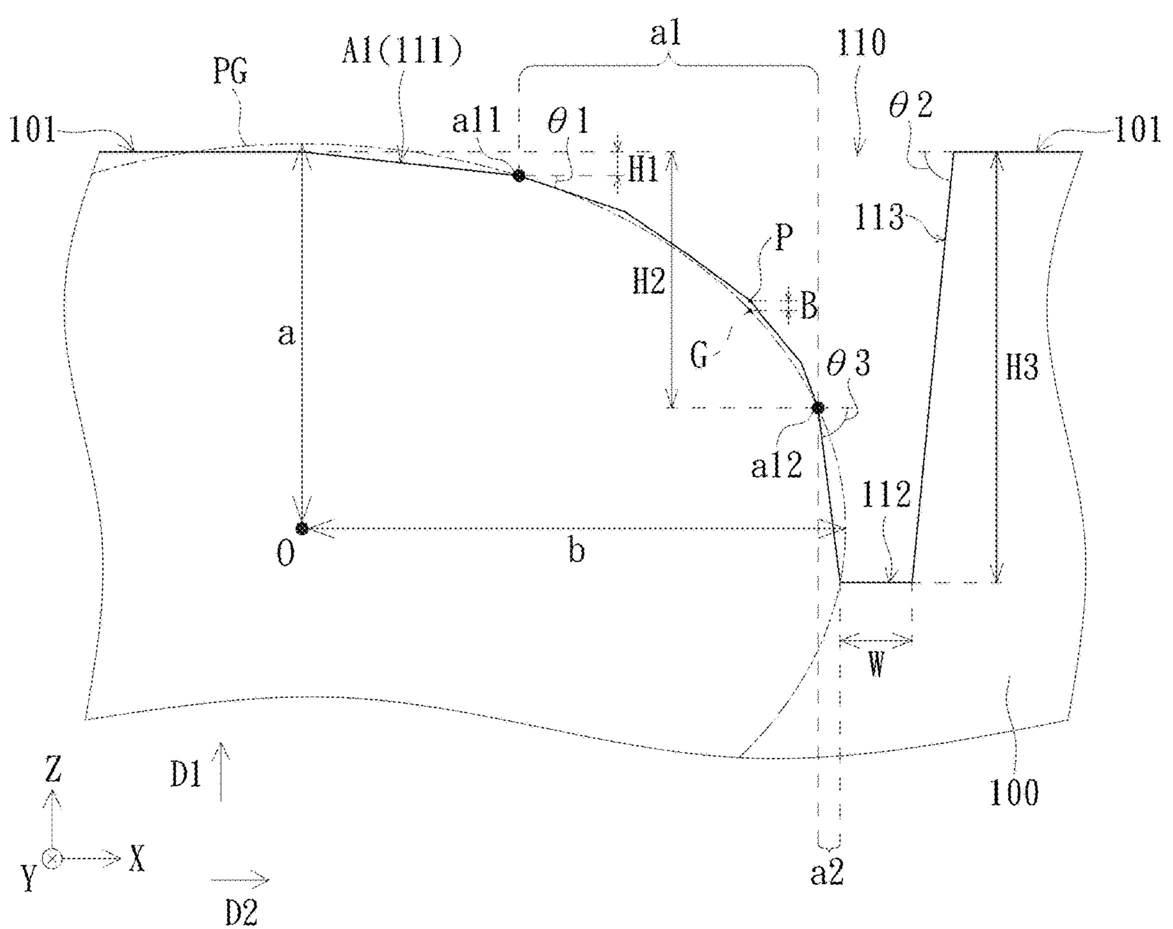
FIG. 3 is a schematic enlarged view of a microstructure in FIG. 2.
Figure 4:
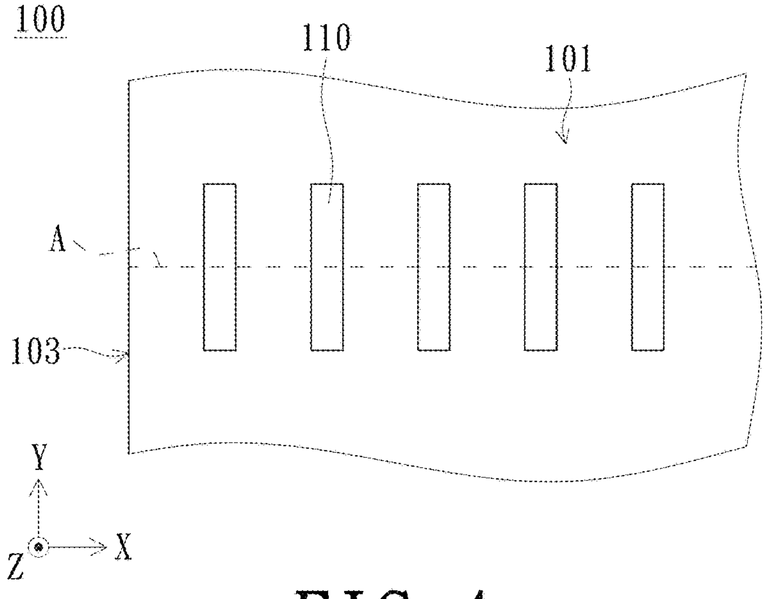
FIG. 4 is a schematic top view of a light guide plate according to an embodiment of the disclosure.

FIG. 2 is a schematic enlarged view of a microstructure in FIG. 1. FIG. 3 is a schematic enlarged view of a microstructure in FIG. 2. FIG. 4 is a schematic top view of a light guide plate according to an embodiment of the disclosure. Refer to FIG. 2 to FIG. 4. In this embodiment, each microstructure 110 has, for example, a first structural surface 111 connecting the first surface 101, and each microstructure 110 has a symmetry plane A. Specifically, the microstructure 110 in this embodiment is, for example, a concave microstructure recessed from the first surface 101, and an outer contour (that is, a projection of the microstructure 110 on the first surface 101) of the microstructure 110 in a top view is, for example, elongated. As shown in FIG. 4, the symmetry plane A passes through the geometric center of the microstructure 110, and the microstructure 110 is symmetrical (for example, mirror-symmetrical) relative to the symmetry plane A. In this embodiment, the symmetry plane A is perpendicular to the first surface 101. For example, an included angle between the symmetry plane A and the light incident surface 103 is greater than or equal to 45° and less than or equal to 90°. As shown in FIG. 4, for example, the included angle between the symmetry plane A and the light incident surface 103 in this embodiment is 90°, which is not specifically limited in the disclosure. The shapes and arrangement of outer contours of the microstructures 110 in the top view are not specifically limited in the disclosure, and FIG. 4 is only an example. In another embodiment, an outer contour of a projection of the microstructure 110 on the first surface 101 may be a fan-like shape, a triangle, an arc-like shape, or the like (not shown in the figure).

As mentioned above, refer to FIG. 2 and FIG. 3. FIG. 2 and FIG. 3 provide, for example, a schematic sectional view with the symmetry plane A as a section. In this embodiment, an intersection between the first structural surface 111 and the symmetry plane A is provided with a first intersection line A1, and the first intersection line A1 includes a first line segment part a1. The first line segment part a1 has a first end a11 and a second end a12 that are opposite to each other, there may be optionally a first height H1 (greater than 0) between the first end a11 and the first surface 101, or the first end a11 is located on the first surface 101 (the first height H1 is 0), and a first included angle θ1 may be formed between a tangent line at each position on the first line segment part a1 and the first surface 101. In an embodiment, for example, an included angle (namely, the first included angle θ1 at the first end a11) between the tangent line of the first line segment part a1 at the first end a11 and the first surface 101 is greater than 0° and less than or equal to 25°, for example, 10°, but the disclosure is not limited thereto. In another embodiment, as each position on the first intersection line A1 is farther away from the first surface 101, the included angle between the tangent line at each position on the first intersection line A1 and the first surface 101 is larger or unchanged and is less than or equal to 90°. For example, the first included angle θ1 at each position on the first line segment part a1 gradually increases from the first end a11 to the second end a12.

Refer to FIG. 2 and FIG. 3. In this embodiment, the first line segment part a1 is approximate to a part of a contour of a geometric shape PG. Specifically, the first line segment part a1 is approximate to a contour of an upper right half of the geometric shape PG in FIG. 2. The geometric shape PG in this embodiment is drawn with a dashed line, and the geometric shape PG has, for example, a center O, and the center O is, for example, a symmetrical center of the geometric shape PG. The geometric shape PG has, for example, two axes of symmetry, namely a first axis M1 and a second axis M2. The first axis M1 and the second axis M2 are, for example, perpendicular to each other, and an included angle between the first axis M1 and a first direction D1 is less than 10° (as shown in FIG. 2), such as 0°. To be specific, for example, the first axis M1 is parallel to the first direction D1, the second axis M2 is parallel to a second direction D2, and the first direction D1 is perpendicular to the first surface 101. In this embodiment, "a" is a half-axis length of the first axis M1, namely, a half of a distance between two intersection points of the geometric shape PG on the first axis M1; "b" is a half-axis length of the second axis M2, namely, a half of a distance between two intersection points of the geometric shape PG on the second axis M2. For example, the first direction D1 is parallel to a Z direction, and the second direction D2 is parallel to an X direction. X direction, Y direction and Z direction are, for example, perpendicular to each other.

The geometric shape PG in this embodiment conforms to:

$$\frac{x^2}{b^2} + \frac{y^2}{a^2} = 1,$$

where $-a \le y \le a$, $-b \le x \le b$, and a ratio of a to b is greater than or equal to 0.1 and less than or equal to 2. In an embodiment, the ratio of a to b is, for example, 0.7 (as shown in FIG. 2 and FIG. 3), but the disclosure is not limited thereto. A boundary point between the first intersection line A1 (the first structural surface 111) and the first surface 101 is, for example, an intersection point between the first axis M1 of the geometric shape PG and the light guide plate 100. It should be noted that the first line segment part a1 in an embodiment of the disclosure, for example, coincides with a part of a contour of the geometric shape PG. The geometric shape PG is, for example, circular or elliptical. To be specific, the first line segment part a1 may be a part of a contour of a perfect circle or an ellipse in mathematical definition. There may be a slight error between the first line segment part a1 and the part of the contour of the geometric shape PG because of various factors in a process. When the slight error is within a specific range, the first line segment part a1 is approximate to the part of the contour of the geometric shape PG.

Specifically, in this embodiment, as shown in FIG. 3, the first line segment part a1 is approximate to the part of the contour of the geometric shape PG in the following case: a distance B between each position point (such as point P in FIG. 3) of the first line segment part a1 and a corresponding position point (such as point G in FIG. 3, a connecting line between point G and point P is parallel to the first direction D1) of the part of the contour of the geometric shape PG on the first direction D1 is less than or equal to one-fifth of the half-axis length a of the first axis M1 of the geometric shape PG. In other words, an error value (namely, the distance B) between each position point of the first line segment part a1 and a corresponding position of the part of the contour of the geometric shape PG in the first direction D1 is less than or equal to one-fifth of the half-axis length a of the first axis M1 of the geometric shape PG. In another embodiment, the distance B between each position point (such as point P in FIG. 3) of the first line segment part a1 and a corresponding position point (such as point G in FIG. 3) of the part of the contour of the geometric shape PG on the first direction D1 is, for example, less than or equal to one-tenth of the half-axis length a of the first axis M1 of the geometric shape PG.

Figure 5:
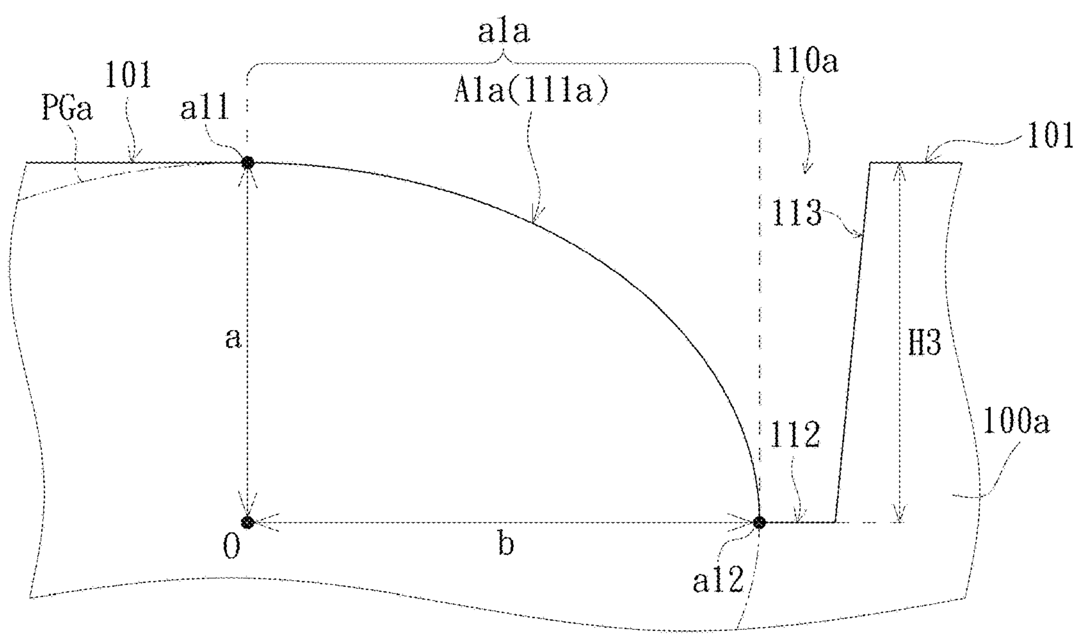
FIG. 5 is a schematic sectional diagram of a single microstructure in a light guide plate according to another embodiment of the disclosure.

In addition, there is a second height H2 between the second end a12 and the first surface 101, and each microstructure 110 has a maximum depth H3 (namely, a height of each microstructure 110 in the first direction D1). An absolute value of a difference between the first height H1 and the second height H2 is greater than or equal to one-third of the maximum depth H3, preferably greater than or equal to one-half of the maximum depth H3, and more preferably greater than or equal to two-thirds of the maximum depth H3, but the disclosure is not limited thereto. In an embodiment, the absolute value of the difference between the first height H1 and the second height H2 can be equal to the maximum depth H3, as shown in FIG. 5.

Figure 7:
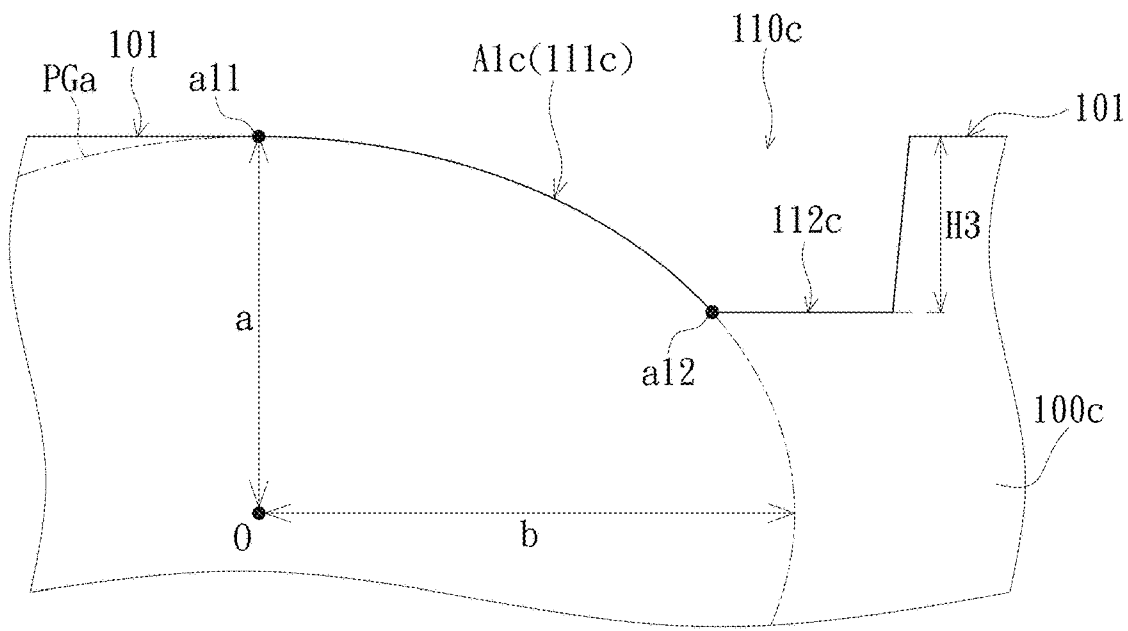
FIG. 7 is a schematic sectional diagram of a single microstructure in a light guide plate according to another embodiment of the disclosure.

In addition, in this embodiment, the maximum depth H3 is, for example, greater than or equal to one-fourth of the half-axis length a of the first axis M1 and less than or equal to two-thirds of the half-axis length a of the first axis M1. For example, in an embodiment, the maximum depth H3 is 1.14 times the half-axis length a of the first axis M1 (as shown in FIG. 3). In another embodiment, the maximum depth H3 can be equal to the half-axis length a of the first axis M1 (as shown in FIG. 5). In still another embodiment, the maximum depth H3 may alternatively be approximately 0.58 times the half-axis length a of the first axis M1 (as shown in FIG. 7), which is not specifically limited in the disclosure.

Refer to FIG. 1 and FIG. 2. When light provided by the light source element 210 is transmitted to the first structural surface 111, some of the light can be partially or totally reflected on the first structural surface 111 once or several times, thereby redirecting a transmission direction of the light close to a normal direction of the first surface 101 and helping to improve the light emission effect of the surface light source module 10 in a forward direction. For example, as shown in FIG. 1, the light 211*a* is transmitted to the first line segment part a1 of the first structural surface 111, is reflected, and then sequentially transmitted to another part of the first line segment part a1 away from the first surface 101 and the second surface 102, so that the light 211*a* is emitted from the second surface 102 of the light guide plate 100 in an approximately forward direction. The light 211*b* is, for example, transmitted to the first line segment part a1 of the first structural surface 111, is reflected, and then transmitted to the second surface 102, so that the light 211*b* is also emitted from the second surface 102 of the light guide plate 100 in an approximately forward direction.

The surface light source module 10 in this embodiment further includes, for example, a covering layer 220 and an optical adhesive layer 230. The covering layer 220 is disposed opposite to the first surface 101. The optical adhesive layer 230 is, for example, disposed between the light guide plate 100 and the covering layer 220 and covers the plurality of microstructures 110.

The display device 1 in this embodiment is, for example, a reflective display device, the covering layer 220 is, for example, glass or a touch panel, the optical adhesive layer 230 is, for example, optically clear adhesive, and the surface light source module 10 is, for example, a front light module. The display element 20 is, for example, disposed opposite to the second surface 102, and the optical adhesive layer 230 is, for example, further disposed between the light guide plate 100 and the display element 20. In addition, the surface light source module 10 in this embodiment may further include an optical film (not shown) disposed between the optical adhesive layer 230 and the covering layer 220. The optical film is, for example, a polarizing film, a brightness enhancing film, or a combination thereof, which can reduce stray light and improve a contrast ratio and a viewing angle.

Because the surface light source module 10 in this embodiment further includes the optical adhesive layer 230 disposed between the light guide plate 100 and the covering layer 220, stray light generated by the reflection of ambient light at an interface between the light guide plate 100 and an air gap can be reduced, thereby improving the visibility of the display device 1. Specifically, for example, the light guide plate 100 in this embodiment has a first refractive index, the optical adhesive layer 230 has a second refractive index, and the second refractive index is less than the first refractive index. For example, a difference value between the first refractive index and the second refractive index is between 0.1 and 0.15. The first refractive index is, for example, 1.5-1.6, such as 1.57, and the second refractive index is, for example, 1.4-1.5, such as 1.42 or 1.47, which is not specifically limited in the disclosure. When the surface light source module 10 is used in the display device 1 (for example, a reflective display device), and the display device 1 is in a place with strong ambient light, the optical adhesive layer 230 covers and fills a plurality of microstructures 110, so that a difference value between the second refractive index and the first refractive index is far less than a difference value between air and the first refractive index. Therefore, reflection of the ambient light at the interface of the light guide plate 100 can be reduced, thereby improving the visibility of the display device 1. In addition, because the first structural surface 111 is provided with the first line segment part a1, even if the difference value between the first refractive index and the second refractive index is small, the light can still be totally internally reflected.

Based on the above, the optical adhesive layer 230 in this embodiment, for example, at least contacts the first line segment part a1. The optical adhesive layer 230 in this embodiment is, for example, fully filled (or fully bonded) between the light guide plate 100 and the covering layer 220. The optical adhesive layer 230 is fully filled, so that the covering layer 220 is more firmly bonded to the light guide plate 100, making the structure stronger and reducing stray light. Further, touch experience can be improved when the covering layer 220 is, for example, a touch panel.

Still refer to FIG. 3. Each microstructure 110 in this embodiment is concave from the first surface 101 as previously described, and also has, for example, a second structural surface 112 and a third structural surface 113. The second structural surface 112 is, for example, connected between the first structural surface 111 and the third structural surface 113, the third structural surface 113 is, for example, connected to the first surface 101. The second end a12 is, for example, close to the second structural surface 112. Specifically, there is an intersection line between the microstructure 110 and the symmetry plane A, and a direction from a side close to the light incident surface 103 to a side away from the light incident surface 103 (such as along the second direction D2), on the intersection line, a point at which a difference between an included angle (absolute value) between a tangent line at one point and the first surface 101 and an included angle (absolute value) between a tangent line at an adjacent point and the first surface 101 is greater than a specific angle value can be defined as a junction between the first intersection line A1 (the first structural surface 111) and the second structural surface 112, and the specific angle value may be, for example, 30°. For example, as shown in FIG. 3, a place at which the included angle between the tangent line of the intersection line and the first surface 101 is equal to 85° and then changed into 0° is the junction between the first intersection line A1 and the second structural surface 112. Still refer to FIG. 3, there is, for example, a second included angle θ2 between the third structural surface 113 and the first surface 101, and the second included angle θ2 is, for example, greater than or equal to 50° and less than or equal to 90°. Specifically, the third structural surface 113 in this embodiment is, for example, a plane (that is, an intersection line between the third structural surface 113 and the symmetry plane A is, for example, a straight line), and the second included angle θ2 is preferably approximate to 90°.

Figure 6:
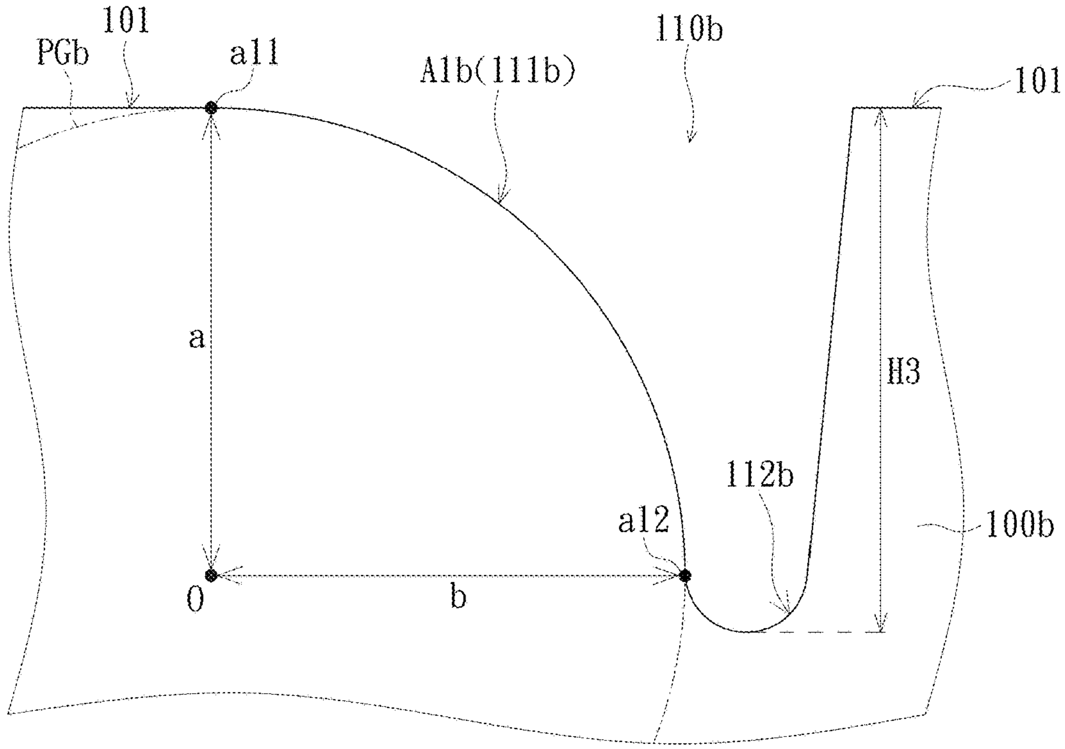
FIG. 6 is a schematic sectional diagram of a single microstructure in a light guide plate according to another embodiment of the disclosure.

Based on the above, for example, the second structural surface 112 has a width W along the second direction D2 perpendicular to the light incident surface 103, and the width W is, for example, greater than or equal to one-tenth of the maximum depth H3, and, for example, less than or equal to one-half of the maximum depth H3. For example, the width W is 2 μm, which is not specifically limited in the disclosure. In addition, in this embodiment, as shown in FIG. 2 and FIG. 3, the second structural surface 112 is, for example, a plane, but the disclosure is not limited thereto. In another embodiment, as shown in FIG. 6, the second structural surface 112 may be an arc surface. The second direction D2 is, for example, parallel to an X direction.

Still refer to FIG. 3. The first intersection line A1 in this embodiment further includes, for example, a second line segment part a2. The second line segment part a2 is, for example, connected between a second end a12 of the first line segment part a1 and the second structural surface 112. The second line segment part a2 is, for example, a straight line. A third included angle θ3 is formed between the second line segment part a2 and the first surface 101, and the third angle θ3 is, for example, between 80° and 90°. In an embodiment, the third included angle θ3 is, for example, 85°, but the disclosure is not limited thereto.

Because the surface light source module 10 in this embodiment is provided with the microstructure 110 having the first structural surface 111, the surface light source module 10 can provide light beams that are emitted evenly in a forward direction and transmitted toward the display element 20. In addition, the surface light source module 10 in this embodiment uses the optical adhesive layer 230 to cover the plurality of microstructures 110, helping to improve the visibility of the display device 1 under strong ambient light.

FIG. 5 is a schematic sectional diagram of a single microstructure in a light guide plate according to another embodiment of the disclosure. Refer to FIG. 5. A light guide plate 100*a* in this embodiment is similar to the light guide plate 100, and a main difference is that a first intersection line A1*a* in this embodiment coincides with a part of a contour of a geometric shape PGa. To be specific, the first intersection line A1*a* is, for example, not provided with a second line segment part a2, and an angle between a tangent line at each position on the first intersection line A1*a* and the first surface 101 is less than or equal to 90°. Specifically, the geometric shape PG is, for example, the same as the geometric shape PGa, and there is an error (such as less than 10 nm) that can be ignored or nearly no error between the first line segment part a1*a* and the part of the contour of the geometric shape PGa at the scale of the microstructure 110. Therefore, it can be understood that the first line segment part a1*a* coincides with the part of the contour of the geometric shape PGa. In the embodiment shown in FIG. 5, a boundary point between the first intersection line A1*a* and the first surface 101 is, for example, an intersection point between a first axis M1 of the geometric shape PGa and the first surface 101 of the light guide plate 100*a*, and is also the first end a11 of the first line segment part a1*a*. In addition, for example, the second end a12 of the first line segment part a1*a* overlaps with a boundary point between the first structural surface 111*a* and the second structural surface 112. It should be specifically noted that, in an embodiment, the first end a11 of the first line segment part a1*a* may optionally not be located on the first surface 101, and the second end a12 of the first line segment part a1*a* may also selectively not be located at the boundary point between the first structural surface 111*a* and the second structural surface 112. To be specific, the length of the first line segment part a1*a* is less than the length of the first intersection line Ala. In addition, as each position on the first intersection line A1*a* is farther away from the first surface 101, the included angle between the tangent line at each position on the first intersection line A1*a* and the first surface 101 is larger or unchanged and is less than or equal to 90°. A value of the first included angle θ1 (as shown in FIG. 3) at each position on the first line segment part a1*a* gradually increases from the first end a11 to the second end a12.

FIG. 6 is a schematic sectional diagram of a single microstructure in a light guide plate according to another embodiment of the disclosure. Refer to FIG. 6. The light guide plate 100*b* in this embodiment is similar to the light guide plate 100*a* of FIG. 5, and main differences are that the geometric shape PGb in this embodiment is different from the geometric shape PGa, and the second structural surface 112*b* is different from the second structural surface 112. Specifically, a ratio of a to b of the geometric shape PGb in this embodiment is for example, 1, which means that the geometric shape PGb is, for example, circular. In addition, the first intersection line Alb in this embodiment coincides with, for example, the part of the contour of the geometric shape PGb, and the first intersection line Alb is, for example, not provided with the second line segment part a2. The second structural surface 112*b* in this embodiment is, for example, semicircular or arc-shaped, which is not specifically limited in the disclosure.

FIG. 7 is a schematic sectional diagram of a single microstructure in a light guide plate according to another embodiment of the disclosure. Refer to FIG. 7. A light guide plate 100*c* in this embodiment is similar to the light guide plate 100*a* of FIG. 5, and main differences are the length of the first intersection line A1*c* and the maximum depth H3 of a microstructure 110*c*. Specifically, the length of the first intersection line A1*c* (namely, the length of a trajectory from a first end a11 to a second end a12 in FIG. 7) is, for example, less than a quarter of a contour (for example, a perimeter of an ellipse) of a geometric shape PGa, while the length of the first intersection line A1*a* is, for example, equal to a quarter of the contour of the geometric shape PGa. A maximum depth H3 of a microstructure 110*c* is, for example, 0.47 times a half-axis length a of a first axis, while the maximum depth H3 of the microstructure 110*a* is, for example, equal to the half-axis length a of the first axis.

Figure 8:
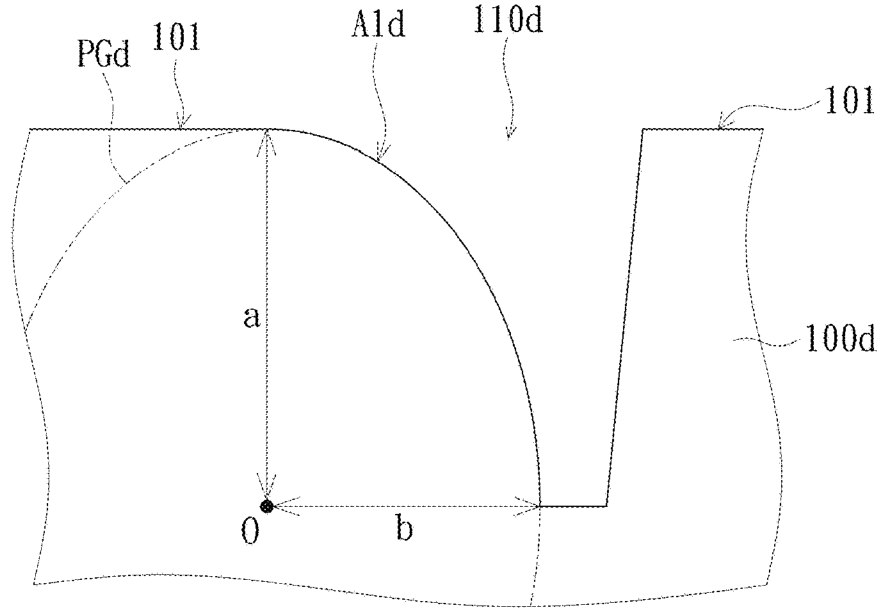
FIG. 8 is a schematic sectional diagram of a single microstructure in a light guide plate according to another embodiment of the disclosure.

FIG. 8 is a schematic sectional diagram of a single microstructure in a light guide plate according to another embodiment of the disclosure. Refer to FIG. 8. A light guide plate 100*d* in this embodiment is similar to the light guide plate 100*a* of FIG. 5, and a main difference is that a geometric shape PGd is different from the geometric shape PGa. Specifically, a ratio of a to b of the geometric shape PGd in this embodiment is, for example, greater than 1, and the ratio of a to b is, for example, 1.375, but the disclosure is not limited thereto. A first intersection line A1*d* in this embodiment coincides with, for example, a part of a contour of the geometric shape PGd, and the first intersection line A1*d* is, for example, not provided with a second line segment part a2.

Figure 9:
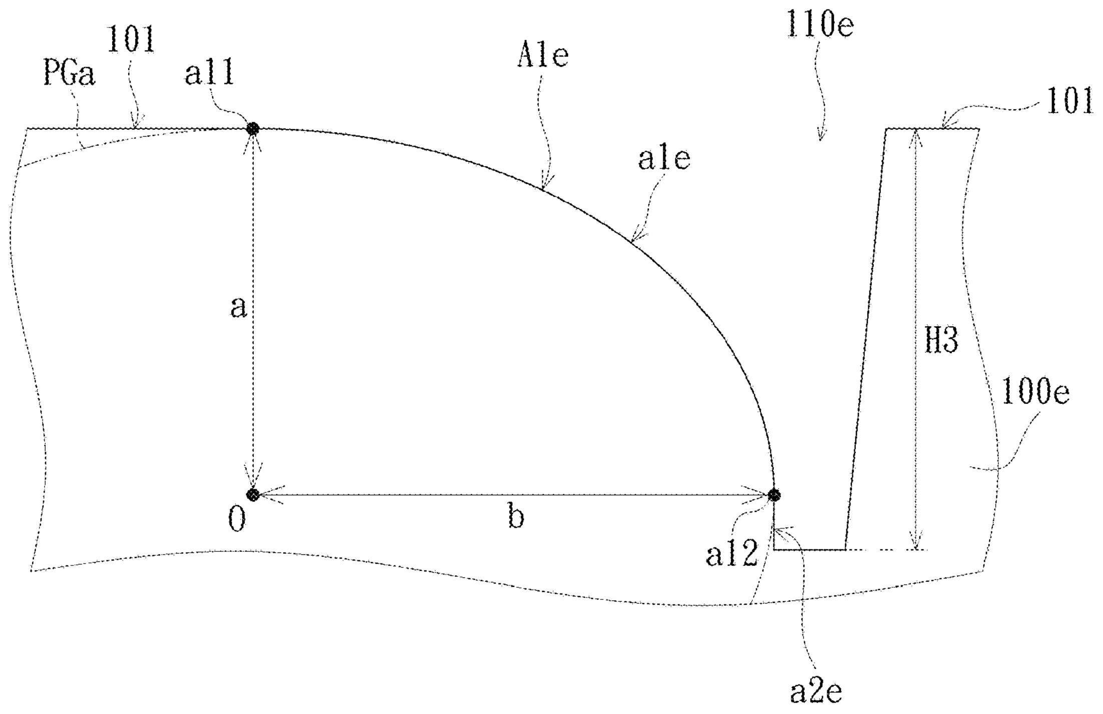
FIG. 9 is a schematic sectional diagram of a single microstructure in a light guide plate according to another embodiment of the disclosure.

FIG. 9 is a schematic sectional diagram of a single microstructure in a light guide plate according to another embodiment of the disclosure. Refer to FIG. 9. A light guide plate 100*e* in this embodiment is similar to the light guide plate 100*a* of FIG. 5, and a main difference is that a first intersection line Ale in this embodiment is, for example, further provided with a second line segment part a2*e*. Specifically, the first intersection line Ale in this embodiment has a first line segment part ale and a second line segment part a2*e*. The first line segment part ale is, for example, the same as the first line segment part ala in FIG. 5. The second line segment part a2*e* is, for example, a straight line, and an included angle between the second line segment part a2*e* and the first surface 101 is, for example, equal to an included angle between a tangent line of the first line segment part ale at the second end a12 and the first surface 101. For example, in this embodiment, the included angle between the second line segment part a2*e* and the first surface 101 is, for example, 90°, but the disclosure is not limited thereto. It should be noted that the included angle between the second line segment part a2*e* and the first surface 101 is not more than 90°. In addition, compared with the embodiment shown in FIG. 5, because the embodiment shown in FIG. 9 is further provided with the second line segment part a2*e*, a maximum depth H3 of a microstructure 110*e* is, for example, greater than a half-axis length a of a first axis, which is not specifically limited in the disclosure.

Figure 10:
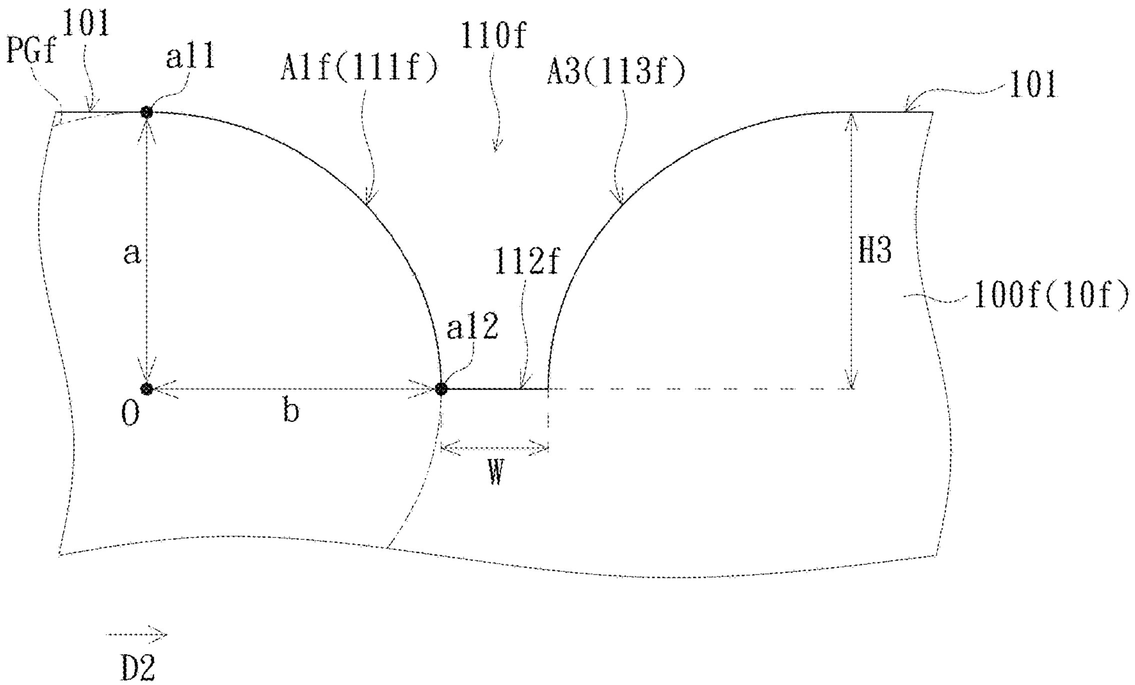
FIG. 10 is a schematic sectional diagram of a single microstructure in a light guide plate according to another embodiment of the disclosure.

FIG. 10 is a schematic sectional diagram of a single microstructure in a light guide plate according to another embodiment of the disclosure. Refer to FIG. 10. A light guide plate 100*f* in this embodiment is similar to the light guide plate 100*a* of FIG. 5, and main differences are a first structural surface 111*f* and a third structural surface 113*f*, and the specific description is as follows. In the embodiment shown in FIG. 10, an intersection line between the third structural surface 113*f* and a symmetry plane A is, for example, provided with a third intersection line A3, and the third intersection line A3 and the first intersection line Alf are, for example, mirror-symmetrical. The second structural surface 112*f* has a width W along the second direction D2 perpendicular to a light incident surface, and the width W is, for example, greater than or equal to one-tenth of the maximum depth H3. In detail, the geometric shape PGf is, for example, similar to the geometric shape PGa. Because the microstructure 110*f* of the light guide plate 100*f* in this embodiment is provided with the third intersection line A3 and the first intersection line Alf that are mirror-symmetrical, the microstructure 110*f* can be used in a surface light source module 10*f* with light emitted bidirectionally.

Figure 11:
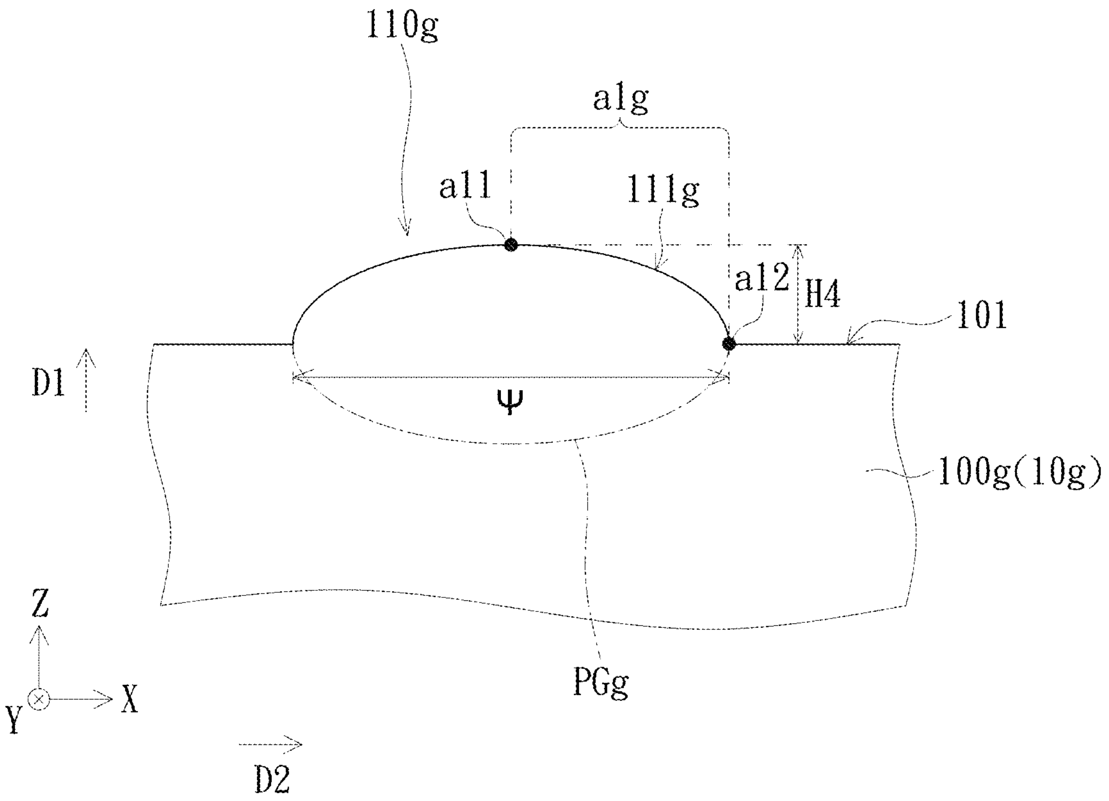
FIG. 11 is a schematic sectional diagram of a single microstructure in a light guide plate according to another embodiment of the disclosure.

FIG. 11 is a schematic sectional diagram of a single microstructure in a light guide plate according to another embodiment of the disclosure. Refer to FIG. 11. Each microstructure 110*g* in this embodiment, for example, protrudes from a first surface 101, a first end a11 of a first line segment part a1*g* is, for example, away from the first surface 101, and a second end a12 is, for example, close to the first surface 101. Specifically, a geometric shape PGg is, for example, similar to the geometric shape PGa shown in FIG. 5. In addition, a junction surface that is of each microstructure 110*g* and that is connected to the first surface 101 has, for example, a maximum width ψ along the second direction D2 perpendicular to the light incident surface 103, each microstructure 110*g* has, for example, a maximum height H4 in the first direction D1 perpendicular to the first surface 101, the maximum height H4 is, for example, less than or equal to three-tenths of the maximum width ψ. When the microstructure 110*g*, for example, protrudes from the first surface 101, the microstructure 110*g* (that is, a ratio of the maximum height H4 to the maximum width ψ is small) helps light (as shown in FIG. 1) be transmitted to a first structural surface 111*g*.

It should be specifically noted that a microstructure in an embodiment of the disclosure is, for example, a concave microstructure concave from the first surface 101, as shown in FIG. 1 to FIG. 10, in this case, the maximum depth H3 represents a maximum depth of the concave microstructure. In another embodiment, the microstructure, for example, protrudes from the first surface 101, as shown in FIG. 11, for example, a maximum height of the convex microstructure is represented by a maximum height H4. It should be noted that a maximum distance between the microstructure and the first surface 101 in the first direction D1 is equivalent to the maximum height H4 or the maximum depth H3, and protruding or recessing of the microstructure from the first surface 101 is considered as a height or depth. Therefore, the maximum height H4 can also be understood as the maximum depth H3, and vice versa.

Figure 12:
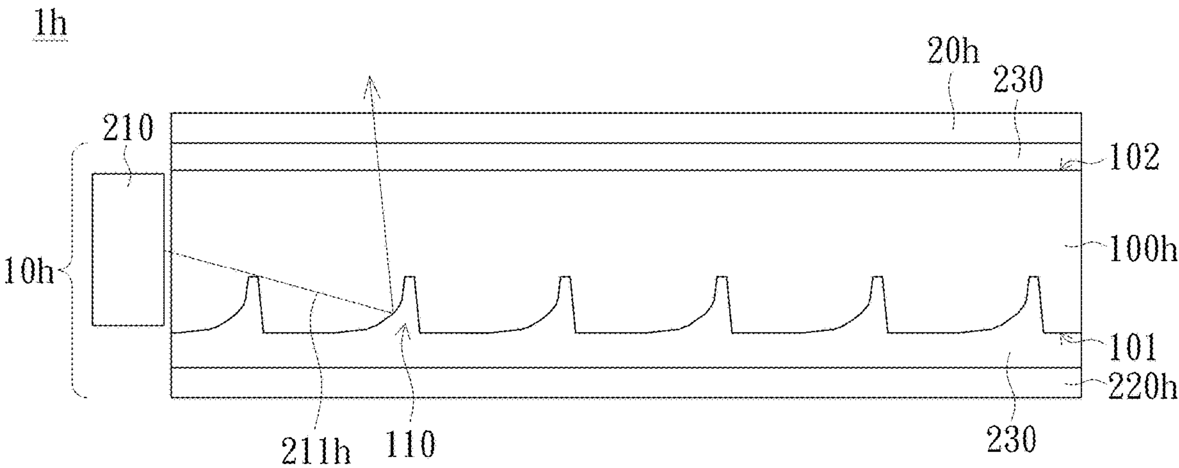
FIG. 12 is a schematic sectional view of a display device according to another embodiment of the disclosure.

FIG. 12 is a schematic sectional view of a display device according to another embodiment of the disclosure. Refer to FIG. 12. A surface light source module 10*h* in this embodiment is similar to the surface light source module 10 of FIG. 1. A main difference is that a second surface 102 of the surface light source module 10*h* is, for example, a light-emitting surface of the surface light source module 10*h*, and a covering layer 220*h* is, for example, a reflective sheet or a transparent base material. In this case, the surface light source module 10*h* is, for example, a backlight module, and the display device 1*h* is, for example, a transparent display device or a backlight display device. Because a light guide plate 100*h* is also provided with the microstructure 110 as shown in FIG. 1, it also helps to redirect a transmission direction of some of the light (such as light 211*h*) of the light source element 210, so that the surface light source module 10*h* can provide light beams that are emitted evenly in a forward direction and that are transmitted toward a display element 20*h*. In addition, the display element 20*h* in this embodiment is, for example, a transmissive liquid crystal panel. In addition, the surface light source module 10*h* may further include an optical film (not shown) disposed between the light guide plate 100*h* and the display element 20*h*. The light guide plate 100*h* and the optical film may be fully attached to each other or there may be an air gap, and the display element 20*h* and the optical film may be fully attached to each other or there may be an air gap.

Figure 13:
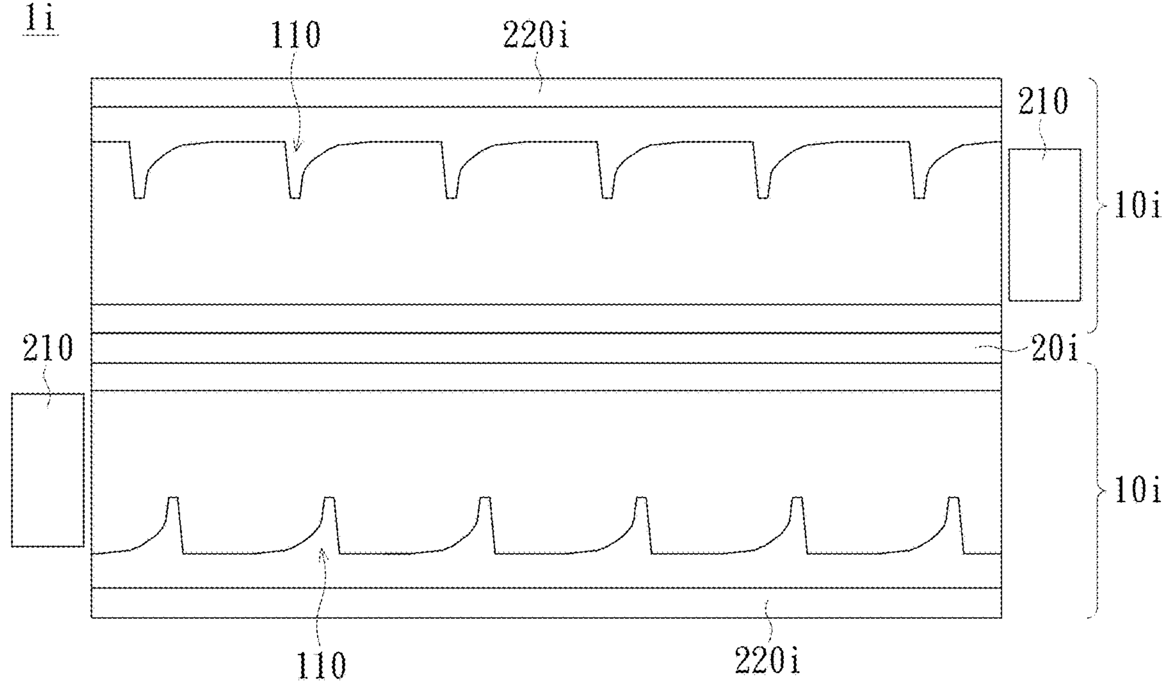
FIG. 13 is a schematic sectional view of a display device according to another embodiment of the disclosure.

FIG. 13 is a schematic sectional view of a display device according to another embodiment of the disclosure. Refer to FIG. 1 and FIG. 13. A display device 1*i* in an embodiment of the disclosure includes, for example, a display element 20*i* and two surface light source modules 10*i*, the display element 20*i* is disposed between two surface light source modules 10*i*, and the display device 1*i* is, for example, a two-way transparent display device. The surface light source module 10*i* in this embodiment is similar to the surface light source module 10 in FIG. 1, and main differences are that a covering layer 220*i* of the surface light source module 10*i* is a transparent base material, the display element 20*i* is, for example, a transparent display panel, but the disclosure is not limited thereto. Microstructures 110 of the surface light source module 10*i* in this embodiment are the same as the microstructures 110 of the surface light source module 10, but the disclosure is not limited thereto. In another embodiment, the microstructure 110 of the surface light source module 10*i* may be a microstructure 110*a*, a microstructure 110*b*, a microstructure 110*c*, a microstructure 110*d*, a microstructure 110*e*, a microstructure 110*f*, or a microstructure 110*g*. In addition, the microstructures 110 of the two surface light source modules 10*i* in this embodiment are, for example, the same, which is not specifically limited in the disclosure. In another embodiment, the microstructures 110 of the two surface light source modules 10*i* may be different.

It should be noted that light source elements 210 of the two surface light source modules 10*i* in this embodiment are disposed, for example, opposite to each other, which is not specifically limited in the disclosure. In another embodiment, the light source elements 210 of the two surface light source modules 10*i* may be disposed on a same side, such as a left side or right side in FIG. 13.

To sum up, because the surface light source module and the microstructures of the light guide plate of the display device in the embodiment of the disclosure has the first line segment part on the first intersection line, the disclosure has advantages of uniform light emitting and good forward light emitting effect. In addition, the surface light source module in an embodiment of the disclosure has an optical adhesive layer covering a plurality of microstructures. When the surface light source module is used in the display device (such as a two-way transparent display device or another one-way display device in the disclosure), it helps to improve the visibility of the display device under strong ambient light.

The foregoing description of the preferred embodiment of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure" is not necessary limited the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A surface light source module, comprising a light guide plate and a light source element, wherein:

the light guide plate has a first surface, a second surface opposite to the first surface, and a light incident surface connecting the first surface and the second surface, and the first surface is provided with a plurality of microstructures; and the light source element is disposed opposite to the light incident surface, wherein each of the plurality of microstructures has a first structural surface connecting the first surface, each of the plurality of microstructures has a symmetry plane, the symmetry plane is perpendicular to the first surface, a boundary between the first structural surface and the symmetry plane has a first intersection line, the first intersection line comprises a first line segment part, and the first line segment part has a first end and a second end that are opposite to each other, there is a first height between the first end and the first surface, there is a second height between the second end and the first surface, each of the plurality of microstructures has a maximum depth, and an absolute value of a difference between the first height and the second height is greater than or equal to one-third of the maximum depth, and a distance between each position point of the first line segment part and a corresponding position point of a part of a contour of a geometric shape in a first direction is less than or equal to one-fifth of a half-axis length of a first axis of the geometric shape, wherein the first direction is perpendicular to the first surface, and the geometric shape conforms to:

$$\frac{x^2}{b^2}+\frac{y^2}{a^2}=1,$$

wherein $-a \leq y \leq a$, $-b \leq x \leq b$, a ratio of a to b is between 0.1 and 2, a is the half-axis length of the first axis, and b is a half-axis length of a second axis of the geometric shape.

2. The surface light source module according to claim 1, wherein an included angle between the symmetry plane and the light incident surface is between 45° and 90°, an included angle between the first axis and the first direction is less than 10°, a first included angle is formed between a tangent line at each position on the first line segment part and the first surface, and a value of each first included angle gradually increases from the first end to the second end.

3. The surface light source module according to claim 1, wherein the maximum depth is greater than or equal to one-fourth of the half-axis length of the first axis and less than or equal to two-thirds of the half-axis length of the first axis.

4. The surface light source module according to claim 1, wherein an included angle between a tangent line of the first line segment part at the first end and the first surface is greater than 0° and less than or equal to 25°.

5. The surface light source module according to claim 1, further comprising a covering layer and an optical adhesive layer, wherein:

the covering layer is disposed opposite to the first surface; and the optical adhesive layer is disposed between the light guide plate and the covering layer and covers the plurality of microstructures, wherein the optical adhesive layer contacts at least the first line segment part.

6. The surface light source module according to claim 1, wherein each of the plurality of microstructures is concave from the first surface, each of the plurality of microstructures further has a second structural surface and a third structural surface, the second structural surface is connected between the first structural surface and the third structural surface, the third structural surface is connected to the first surface, and the second end is close to the second structural surface; and there is a second included angle between the third structural surface and the first surface, the second included angle is greater than or equal to 50° and less than or equal to 90°, and the second structural surface has a width along a second direction perpendicular to the light incident surface, and the width is greater than or equal to one-tenth of the maximum depth.

7. The surface light source module according to claim 6, wherein the first intersection line further comprises a second line segment part, the second line segment part connects the second end of the first line segment part and the second structural surface, the second line segment part is a straight line, there is a third included angle between the second line segment part and the first surface, and the third included angle is between 80° and 90°.

8. The surface light source module according to claim 1, wherein each of the plurality of microstructures is concave from the first surface, each of the plurality of microstructures further has a second structural surface and a third structural surface, the second structural surface is connected between the first structural surface and the third structural surface, the third structural surface is connected to the first surface, and the second end is close to the second structural surface, wherein a third intersection line is provided at a boundary between the third structural surface and the symmetry plane, the third intersection line and the first intersection line are mirror-symmetrical, the second structural surface has a width along a second direction perpendicular to the light incident surface, and the width is greater than or equal to one-tenth of the maximum depth.

9. The surface light source module according to claim 1, wherein each of the plurality of microstructures protrudes from the first surface, the first end of the first line segment part is away from the first surface, and the second end is close to the first surface.

10. The surface light source module according to claim 9, wherein a surface on which each of the plurality of microstructures is connected to the first surface has a maximum width along a second direction perpendicular to the light incident surface, each of the plurality of microstructures has a maximum height, and the maximum height is less than or equal to three-tenths of the maximum width.

11. The surface light source module according to claim 1, further comprising a covering layer, and the covering layer is disposed opposite to the first surface, wherein the covering layer is glass or a touch panel.

12. The surface light source module according to claim 1, further comprising a covering layer, and the covering layer is disposed opposite to the first surface, wherein the second surface is a light-emitting surface of the surface light source module, and the covering layer is a reflective sheet or a transparent base material.

13. A display device, comprising a display element and at least one surface light source module, wherein:

the display element is disposed on one side of the at least one surface light source module, and each at least one surface light source module comprises a light guide plate and a light source element, wherein:

the light guide plate has a first surface and a second surface that are opposite to each other, and a light incident surface connecting the first surface and the second surface, the second surface is close to the display element, and the first surface is provided with a plurality of microstructures; and the light source element is disposed opposite to the light incident surface, wherein each of the plurality of microstructures has a first structural surface connecting the first surface, each of the plurality of microstructures has a symmetry plane, the symmetry plane is perpendicular to the first surface, a boundary between the first structural surface and the symmetry plane has a first intersection line, the first intersection line comprises a first line segment part, and the first line segment part has a first end and a second end that are opposite to each other, there is a first height between the first end and the first surface, there is a second height between the second end and the first surface, each of the plurality of microstructures has a maximum depth, and an absolute value of a difference between the first height and the second height is greater than or equal to one-third of the maximum depth, and a distance between each position point of the first line segment part and a corresponding position point of a part of a contour of a geometric shape in a first direction is less than or equal to one-fifth of a half-axis length of a first axis of the geometric shape, wherein the first direction is perpendicular to the first surface, and the geometric shape conforms to:

$$\frac{x^2}{b^2} + \frac{y^2}{a^2} = 1,$$

wherein $-a \leq y \leq a$, $-b \leq x \leq b$, a ratio of a to b is between 0.1 and 2, a is the half-axis length of the first axis, and b is a half-axis length of a second axis of the geometric shape.

14. The display device according to claim 13, wherein each at least one surface light source module further comprises a covering layer and an optical adhesive layer, wherein the covering layer is disposed opposite to the first surface; and the optical adhesive layer is disposed between the light guide plate and the covering layer and covers the plurality of microstructures, wherein the optical adhesive layer contacts at least the first line segment part, and the covering layer is a transparent base material or a reflective sheet.

15. The display device according to claim 13, wherein the display device comprises two surface light source modules, wherein the display element is disposed between the two surface light source modules.

* * * * *